United States Patent
Kamimura et al.

(10) Patent No.: US 11,427,897 B2
(45) Date of Patent: Aug. 30, 2022

(54) PRODUCTION METHOD OF MARAGING STEEL

(71) Applicants: HITACHI METALS, LTD., Minato-ku (JP); SAFRAN AIRCRAFT ENGINES, Paris (FR)

(72) Inventors: Takahiko Kamimura, Yasugi (JP); Laurent Ferrer, Cedex (FR); Pascal Poulain, Cedex (FR)

(73) Assignees: HITACHI METALS, LTD., Minato-ku (JP); SAFRAN AIRCRAFT ENGINES, Paris (FR)

( * ) Notice: Subject to any disclaimer, the term of this patent is extended or adjusted under 35 U.S.C. 154(b) by 956 days.

(21) Appl. No.: 15/317,043

(22) PCT Filed: Jun. 10, 2014

(86) PCT No.: PCT/JP2014/065375
§ 371 (c)(1),
(2) Date: Dec. 7, 2016

(87) PCT Pub. No.: WO2015/189919
PCT Pub. Date: Dec. 17, 2015

(65) Prior Publication Data
US 2017/0096728 A1    Apr. 6, 2017

(51) Int. Cl.
*C21C 5/52* (2006.01)
*C22C 38/14* (2006.01)
(Continued)

(52) U.S. Cl.
CPC .............. *C22C 38/14* (2013.01); *B22D 1/002* (2013.01); *B22D 7/00* (2013.01); *C21C 5/52* (2013.01);
(Continued)

(58) Field of Classification Search
CPC ........ B22D 27/02; B22D 1/002; B22D 23/00; B22D 7/00; C22C 38/00; C22C 38/001;
(Continued)

(56) References Cited

U.S. PATENT DOCUMENTS 3,687,187 A * 8/1972 Tommaney ............ B22D 23/10
  75/10.23
6,776,855 B1 * 8/2004 Ueda ...................... C22C 38/001
  148/328

(Continued)

FOREIGN PATENT DOCUMENTS

JP    11-293407 A    10/1999
JP    2002-161308 A    6/2002
(Continued)

OTHER PUBLICATIONS

JP 2003-183765 J-Plat-Pat Machine Translation. Accessed Apr. 8, 2019. (Year: 2019).*
(Continued)

*Primary Examiner* — Alexandra M Moore
(74) *Attorney, Agent, or Firm* — Oblon, McClelland, Maier & Neustadt, L.L.P.

(57) ABSTRACT

A production method of a maraging steel includes: the step of producing, by vacuum melting, a remelt electrode which comprises from 0.2 to 3.0% by mass of Ti and from 0.0025 to 0.0050% by mass of N; and the step of remelting the remelt electrode to produce a steel ingot having an average diameter of 650 mm or more; wherein the resulting maraging steel includes from 0.2 to 3.0% by mass of Ti.

6 Claims, 2 Drawing Sheets

(51) Int. Cl.
| | |
|---|---|
| *C22B 9/20* | (2006.01) |
| *C22C 38/00* | (2006.01) |
| *B22D 1/00* | (2006.01) |
| *C22B 9/00* | (2006.01) |
| *C22B 9/05* | (2006.01) |
| *C22B 9/16* | (2006.01) |
| *B22D 7/00* | (2006.01) |
| *C21C 7/10* | (2006.01) |
| *C22C 33/04* | (2006.01) |
| *C22C 38/02* | (2006.01) |
| *C22C 38/04* | (2006.01) |
| *C22C 38/06* | (2006.01) |
| *C22C 38/10* | (2006.01) |
| *C22C 38/12* | (2006.01) |

(52) U.S. Cl.
CPC ........... *C21C 7/10* (2013.01); *C22B 9/003* (2013.01); *C22B 9/05* (2013.01); *C22B 9/16* (2013.01); *C22B 9/20* (2013.01); *C22C 33/04* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/105* (2013.01); *C22C 38/12* (2013.01); *Y02P 10/25* (2015.11)

(58) Field of Classification Search
CPC ....... C22C 38/002; C22C 38/02; C22C 38/04; C22C 38/06; C22C 38/105; C22C 38/12; C22C 38/14; C22C 33/04; C21B 11/10; C21C 5/52; C21C 7/10; C22B 9/003; C22B 9/20; Y02P 10/253
See application file for complete search history.

(56) References Cited

U.S. PATENT DOCUMENTS 7,597,737 B2 * 10/2009 Hara .................. C21C 7/0006
75/10.64
2004/0093983 A1 5/2004 Mishima et al.

FOREIGN PATENT DOCUMENTS

| JP | 2003-183765 A | 7/2003 |
|---|---|---|
| JP | 2003-221614 A | 8/2003 |
| JP | 2003-221627 A | 8/2003 |
| JP | 2004-183097 A | 7/2004 |
| JP | 2006-200026 A | 8/2006 |
| JP | 4692282 B2 | 6/2011 |

OTHER PUBLICATIONS

"Vacuum Induction Melting" ASM Handbook, vol. 15: Casting p. 1-8. DOI: 10.1361/asmhba0005200 (Year: 2008).*
"Production of maraging steel grades and the influence of specified and nonspecified elements for special applications" Journal of Materials Science 39 (2004) 7295-7302. (Year: 2004).*
International Search Report dated Sep. 9, 2014 in PCT/JP14/065375 Filed Jun. 10, 2014.
Extended European Search Report dated Nov. 24, 2017 in European Patent Application No. 14894706.2, 9 pages.
P. D. Jablonski, et al., "Nitrogen Control in VIM Melts", Proceedings of the 2013 International Symposium on Liquid Metal Processing & Casting, Oct. 25. 2013, XP55416477, pp. 315-319.

* cited by examiner

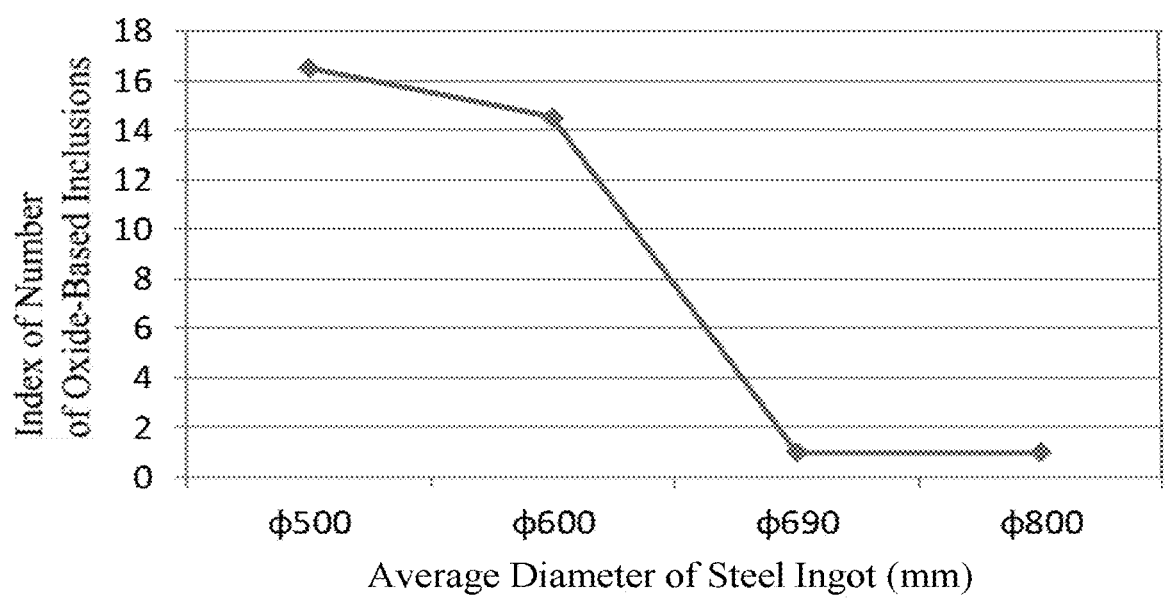

PRODUCTION METHOD OF MARAGING STEEL

TECHNICAL FIELD

The present invention relates to a production method of a maraging steel.

BACKGROUND ART

As a maraging steel has a very high tensile strength of about 2000 MPa, the maraging steel is used in a variety of applications where high strength is required, such as, for example, rocket parts, centrifuge parts, aircraft parts, parts for continuously variable transmissions of automotive engines, and molds.

An example of the maraging steel has a composition of 18% by mass of Ni, 8% by mass of Co, 5% by mass of Mo, 0.45% by mass of Ti, 0.1% by mass of Al, and the balance being Fe. In this way, the maraging steel includes an appropriate amount of Mo and Ti as strengthening elements, and thus aging of the steel can precipitate intermetallic compounds such as $N_3Mo$, $N_3Ti$, and $Fe_2Mo$ to provide high strength.

On the other hand, the maraging steel includes an element such as Ti which leads to formation of non-metallic inclusions, and therefore fatigue strength of the maraging steel is not necessary high. Particularly, non-metallic inclusions such as nitrides (e.g., TiN) and carbonitrides (e.g., TiCN) are one of the largest contributors to reduction of the fatigue strength. When the non-metallic inclusions have grown large in the steel, the grown non-metallic inclusions serve as fracture origins of fatigue fractures.

Therefore, a generally used method for produce a maraging steel includes preparing a consumable electrode for remelting by vacuum melting and using the consumable electrode to produce a maraging steel by vacuum arc remelting.

The maraging steel produced by the vacuum arc remelting has advantages of being uniform (i.e., exhibiting low segregation of components) and having a low content of non-metallic inclusions such as TiN and TiCN.

For example, a method for producing a maraging steel by vacuum arc remelting wherein the current and the mold diameter in the vacuum arc remelting have a specific relationship to each other (see, for example, the Patent Document 1) is known as a method of using the above-mentioned vacuum arc remelting to reduce the size of non-metallic inclusions such as TiN and TiCN.

A method for producing a maraging steel, the method including the steps of forming a magnesium oxide by adding magnesium to molten metal in primary vacuum melting such that the oxide admixed in molten steel includes the magnesium oxide as the major component; solidifying the molten steel, after the magnesium oxide is formed, to obtain a consumable electrode which includes residual magnesium oxide; and remelting the consumable electrode at a higher vacuum than the vacuum in the step of forming the magnesium oxide to decompose the magnesium oxide in the molten metal into magnesium and oxygen such that the resulting molten metal includes magnesium in an amount equal to or less than 50% of the amount of the magnesium in the molten metal in the step of forming magnesium oxide (see, for example, the Patent Document 2) is known as a method for producing a maraging steel which can significantly reduce the size of the inclusions (oxide-based inclusions and nitride-based inclusions).

Patent Document 1: Japanese Patent Application Laid-Open (JP-A) No. 2003-221627

Patent Document 2: Japanese Patent No. 4692282

SUMMARY OF INVENTION

Technical Problem

It is generally known that, in fatigue testing of a metallic material, the larger the size of the test specimen, the lower the fatigue strength, which is referred to as "size effect". When the size effect is large, and when fatigue testing is performed for a standard sized test specimen and the test results are used to design a large metallic product, the metallic product may exhibit insufficient fatigue strength. To solve the problem, it is most preferred to use a test specimen which has the same size as a metallic product to be actually used to perform fatigue testing, although such test method is often difficult in view of costs and time. At present, it is often the case that not only an appropriate size of the test specimen is set in consideration of environment of use of the actual metallic product, but a lot of the test specimens are used in fatigue testing to estimate the fatigue strength of the actual metallic product.

The size effect is mainly attributed to the presence of non-metallic inclusions in the test specimen.

For example, when plural test specimens have been obtained from a metallic material which has a low content of non-metallic inclusions such as TiN and TiCN, and then low-cycle fatigue testing has been performed for the plural test specimens obtained, a test specimen which includes non-metallic inclusions may exhibit a smaller number of cycles to failure (i.e., lower fatigue strength) compared to a test specimen which is free of non-metallic inclusions. Thus, this may result in very large variation in the number of cycles to failure, for example, in a range from thousands of cycles to hundreds of thousands of cycles. This problem often arises especially when test specimens have a small size.

Although a highly clean metallic material such as a maraging steel (especially a maraging steel produced by vacuum arc remelting) often includes such elements in a very small amount, it is very difficult to completely exclude the effects of the non-metallic inclusions. Thus, low-cycle fatigue testing of such metallic material may exhibit a small number of cycles to failure at a certain probability.

As described above, it has been found that the number of cycles to failure may vary widely, and the size effect may be large in fatigue testing of a maraging steel.

On the other hand, because fatigue strength of the maraging steel is not necessary high, it is obviously required that somewhat high fatigue strength of the maraging steel is maintained.

The present invention has been made in view of the above-described circumstances.

The object of the present invention is to provide a production method of a maraging steel for producing a maraging steel which exhibits reduced variation in the results (the number of cycles to failure) of fatigue testing (especially low-cycle fatigue testing), in which the size effect is reduced, and which maintains somewhat high fatigue strength.

Solution to Problem

Following are specific means for solving the above problems.

<1> A production method of a maraging steel, comprising: a step of producing a remelt electrode by vacuum melting, the remelt electrode comprising from 0.2 to 3.0% by mass of Ti and from 0.0025 to 0.0050% by mass of N; and a step of producing a steel ingot having an average diameter of 650 mm or more by remelting the remelt electrode; wherein the resulting maraging steel comprises from 0.2 to 3.0% by mass of Ti.

<2> The production method of a maraging steel according to <1>, wherein the step of producing a remelt electrode comprises adding N to molten steel.

<3> The production method of a maraging steel according to <2>, wherein the N is added to the molten steel by introducing nitrogen gas into an atmosphere in contact with the molten steel.

<4> The production method of a maraging steel according to any one of <1> to <3>, wherein the remelt electrode further comprises from 0.01 to 0.10% by mass of Si.

<5> The production method of a maraging steel according to any one of <1> to <4>, wherein the remelt electrode further comprises from 0.01 to 0.10% by mass of Mn.

<6> The production method of a maraging steel according to any one of <1> to <5>, wherein the remelt electrode further comprises 1.7% by mass or less of Al.

<7> The production method of a maraging steel according to any one of <1> to <6>, wherein the step of remelting the remelt electrode to produce a steel ingot comprises remelting the remelt electrode by vacuum arc remelting.

<8> The production method of a maraging steel according to any one of <1> to <7>, wherein the remelt electrode has a chemical composition of 0.01% by mass or less of C, 1.7% by mass or less of Al, from 0.01 to 0.10% by mass of Si, from 0.01 to 0.10% by mass of Mn, from 0.2 to 3.0% by mass of Ti, from 8.0 to 22.0% by mass of Ni, from 5.0 to 20.0% by mass of Co, from 2.0 to 9.0% by mass of Mo, from 0.0025 to 0.0050% by mass of N, 0.0015% by mass or less of O, and the balance being Fe and unavoidable impurities.

<9> The production method of a maraging steel according to one of <1> to <8>, wherein the steel ingot has a chemical composition of 0.01% by mass or less of C, 1.7% by mass or less of Al, from 0.01 to 0.10% by mass of Si, from 0.01 to 0.10% by mass of Mn, from 0.2 to 3.0% by mass of Ti, from 8.0 to 22.0% by mass of Ni, from 5.0 to 20.0% by mass of Co, from 2.0 to 9.0% by mass of Mo, less than 0.0025% by mass of N, 0.0015% by mass or less of O, and the balance being Fe and unavoidable impurities.

Advantageous Effects of Invention

The present invention can provide a production method of a maraging steel for producing a maraging steel which exhibits reduced variation in the results (the number of cycles to failure) of fatigue testing (especially low-cycle fatigue testing), in which the size effect is reduced, and which maintains somewhat high fatigue strength.

BRIEF DESCRIPTION OF DRAWINGS

FIG. 3 is a graph showing the relationship between the average diameter of a steel ingot and the number of oxide-based inclusions (index of the number of oxide-based inclusions) in a billet prepared by hot forging the steel ingot in an example of the present invention.

DESCRIPTION OF EMBODIMENTS

Figure 1:
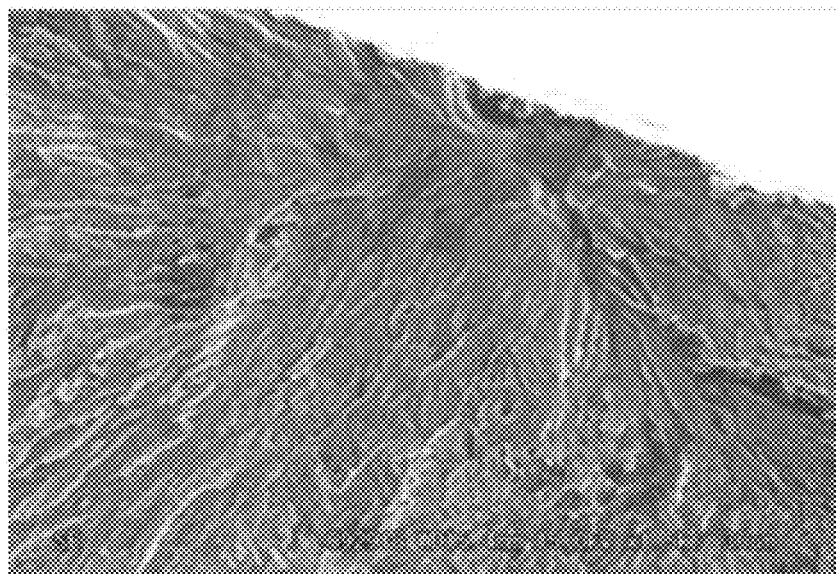
FIG. 1 is a scanning electron microscope image (secondary electron image) of a fracture cross-section of a test specimen after low-cycle fatigue testing in the Example 1.

Now, a production method of a maraging steel of the present invention (hereinafter also referred to as "production method of the present invention") will be described in detail.

The production method of the present invention includes: a step of producing a remelt electrode by vacuum melting, the remelt electrode comprising from 0.2 to 3.0% by mass of titanium (hereinafter also referred to as "Ti") and from 0.0025 to 0.0050% by mass of nitrogen (hereinafter also referred to as "N"); and a step of producing a steel ingot having an average diameter of 650 mm or more by remelting the remelt electrode; wherein the resulting maraging steel comprises from 0.2 to 3.0% by mass of Ti.

The production method of the present invention can produce a maraging steel which exhibits reduced variation in the results (the number of cycles to failure) of fatigue testing (especially low-cycle fatigue testing), in which the size effect is reduced, and which maintains somewhat high fatigue strength.

In the present invention, low-cycle fatigue testing is performed in accordance with ASTM E606.

In the present invention, a maraging steel refers to a ultra-high strength steel which exhibits a very high strength of about 2000 MPa after aging treatment as typically defined.

Now, possible reasons for the above-mentioned effects of the production method of the present invention will be described.

In the production method of the present invention, the remelt electrode (hereinafter also referred to as "electrode") includes from 0.2 to 3.0% by mass of Ti and 0.0025% by mass or more of N. Thus, a resulting steel ingot (maraging steel) includes some amount of titanium nitride (hereinafter referred to as "TiN") and titanium carbonitride (hereinafter also referred to as "TiCN") as Ti-based non-metallic inclusions. The Ti-based non-metallic inclusions grow in the solidification process in the step of producing a remelt electrode. It is believed that the inclusions are partially melted in a molten steel pool produced by remelting the electrode in the step of producing a steel ingot, but the inclusions are not completely melted, and the inclusions re-grow in the solidification process after the remelting. Because the Ti-based non-metallic inclusions grow mainly in the solidification process, their maximum size can be more readily controlled, compared with oxide-based inclusions as described below.

It is believed that the present invention can provide a steel ingot which includes the Ti-based non-metallic inclusions having a moderate size (e g, from 9 to 15 μm) and can uniformly disperse the Ti-based non-metallic inclusions. It is also believed that such Ti-based non-metallic inclusions can serve as fracture origins for most of the fatigue fractures in fatigue testing of the steel ingot, therefore variation in the results (the number of cycles to failure) of fatigue testing (especially low-cycle fatigue testing) can be reduced. And it is believed that a uniform dispersion of the Ti-based non-metallic inclusions having a moderate size in the steel ingot also allows reduction of the size effect.

An example of the "uniform dispersion of the Ti-based non-metallic inclusions" includes a case in which the Ti-based non-metallic inclusions are present, with a probability of greater than about 50%, near the surface of test specimens with an area of 10 mm×20 mm obtained from a billet prepared by forging the steel ingot.

In addition to the Ti-based non-metallic inclusions described above, the electrode (remelt electrode) may include oxide-based inclusions such as alumina ($Al_2O_3$) and spinel ($MgO$—$Al_2O_3$).

In this case, the oxide-based inclusions are also included in the molten steel pool in the step of producing a steel ingot. In the process in which the molten steel pool is solidified to produce a steel ingot, the oxide-based inclusions in the molten steel pool are floated and separated in the molten steel pool, or are trapped at the solidification interface and remain in the steel ingot. The oxide-based inclusions remaining in the steel ingot serve as fracture origins in fatigue testing of the steel ingot and thus reduce the fatigue strength.

The oxide-based inclusions described above grow by convection of the molten steel. This makes it hard to control the maximum size of the oxide-based inclusions, unlike the Ti-based non-metallic inclusions as described above.

In consideration of a case in which the oxide-based inclusions are present, N is included in the electrode in a relatively high amount of 0.0025% by mass or more in the step of producing a remelt electrode in the invention. This allows the Ti-based non-metallic inclusions as described above to readily grow larger in the electrode, compared with the oxide-based inclusions, even when the oxide-based inclusions are present in the electrode.

The step of producing a steel ingot includes remelting the electrode described above to produce a steel ingot.

In the step of producing a steel ingot, although the Ti-based non-metallic inclusions are partially melted in a pool of molten steel, the inclusions are not completely melted, and the inclusions re-grow to a moderate size in the solidification process after the remelting. Thus, a state of the Ti-based non-metallic inclusions in the electrode is maintained similarly in the steel ingot. In other words, the step of producing a steel ingot can provide a steel ingot which includes dispersed Ti-based non-metallic inclusions having a moderate size (for example, a size which is larger than the size of the oxide-based inclusions and which is not too large, e.g., 9-15 μm) and a small variation in the size.

In the step of producing a steel ingot in the invention, a steel ingot having an average diameter of 650 mm or more is produced.

Production of a steel ingot having a large average diameter (in particular, 650 mm or more) tends to slow the rate of advance (for example, the rate of rise) of the solidification interface in the step of producing a steel ingot. This allows a period of time until all of the molten steel pool solidifies, i.e., a period of time until the oxide-based inclusions are floated and separated to be prolonged, thereby effectively producing the effect of floatation separation of the oxide-based inclusions. This can result in a reduced amount of the oxide-based inclusions in the steel ingot.

In addition, the larger the average diameter of the steel ingot (in particular, 650 mm or more), the larger the forging ratio at which the steel ingot is forged (for example, hot-forged) to form a forging tends to be. Such higher forging ratio allows the oxide-based inclusions to be crushed in forging a steel ingot to reduce the size of the inclusions. Thus, effects of the oxide-based inclusions on fatigue testing can be reduced.

In general, interdendritic micropores may be present in a steel ingot. Such micropores often disappear by pressurization in forging (for example, hot forging). But with low pressurization in forging (particularly, at a low forging ratio, the term being described above), defective pores (hereinafter also referred as "voids") may occur in fatigue testing.

A large forging ratio, i.e., an average diameter of the steel ingot of 650 mm or more, is also effective in reduction of defective voids as described above.

Now, the average diameter of a steel ingot will be described.

In the case of a frustum shaped or column shaped steel ingot, the average diameter of the steel ingot refers to the sum of the diameter at the top of the steel ingot and the diameter at the bottom of the steel ingot divided by two.

In the case of a truncated pyramid shaped or prism shaped steel ingot, the average diameter refers to the sum of the diameter of the circumscribed circle at the top of the steel ingot and the diameter of the circumscribed circle at the bottom of the steel ingot divided by two.

As described above, the production method of the present invention can produce a steel ingot which includes uniformly dispersed Ti-based non-metallic inclusions with a moderate size, which is hereinafter refers to, for example, from 9 to 15 μm, and which has reduced influence from oxide-based inclusions.

In the steel ingot produced, it is believed that the Ti-based non-metallic inclusions having a moderate size, for example, larger than the size of oxide-based non-metallic inclusions, but not extremely large, are dispersed uniformly, therefore maldistribution (variation) of locations of fatigue fractures is prevented. More particularly, the Ti-based non-metallic inclusions can serve as fracture origins for most of the fatigue fractures in the steel ingot. In other words, the effects of the inclusions other than the Ti-based non-metallic inclusions are excluded. For this reason, when fatigue testing is performed by obtaining plural test specimens from the steel ingot, variation in the results (the number of cycles to failure) in test specimens is reduced.

For the same reason, in the steel ingot, the size effect may be reduced. In fatigue testing, a highly reliable representative value of the fatigue strength can be obtained with a smaller number of tests.

In addition, the steel ingot includes the Ti-based non-metallic inclusions having a some limited size (i.e., the Ti-based non-metallic inclusions which is not too large) and oxide-based inclusions having a reduced size, and thus the ingot may exhibit somewhat high fatigue strength.

The production method of the present invention can prevent formation of extremely large oxide-based inclusions in a resulting maraging steel. Even if the extremely large oxide-based inclusions were to be formed, it would be easy to detect or control the formation of the oxide-based inclusions.

In the invention, a steel ingot has an average diameter of 650 mm or more, as described above. If a steel ingot had an average diameter of less than 650 mm, the ingot would have insufficient effects. In particular, the steel ingot would tend to exhibit reduced fatigue strength.

Although the upper limit of the average diameter of a steel ingot is not critical, the ingot preferably has an average diameter of 800 mm or less. It is speculated that the average diameter of 800 mm or less prevents Ti-based non-metallic inclusions from growing exceedingly large, which further prevents reduction in the number of cycles in fatigue testing.

In the present invention, the electrode includes N in an amount of from 0.0025 to 0.0050% by mass, as described above.

If the electrode included N in an amount of less than 0.0025% by mass, the oxide-based inclusions would tend to have a larger size compared to the Ti-based non-metallic inclusions, which would reduce the effects of the present invention as described above (especially, the effect of reducing variation in the test results and the effect of reducing the size effect).

On the other hand, if the electrode included N in an amount of more than 0.0050% by mass, defects resulting from micropores would tend to increase.

In the present invention, the electrode and the maraging steel include Ti in an amount of from 0.2 to 3.0% by mass, as described above.

If the electrode and the maraging steel included Ti in an amount of less than 0.2% by mass, the Ti-based non-metallic inclusions would decrease, which would reduce the effects of the present invention.

On the other hand, if the electrode and the maraging steel included Ti in an amount of more than 3.0% by mass, ductility and toughness of the maraging steel would tend to decrease.

Now, each of the steps of the production method of the present invention will be described.

<Step of Producing Remelt Electrode>

The step of producing a remelt electrode is to produce, by vacuum melting, a remelt electrode which includes from 0.2 to 3.0% by mass of Ti and from 0.0025 to 0.0050% by mass of N.

As used herein, "vacuum melting" includes a process of melting a material to provide molten steel and a process of solidifying the resulting molten steel to produce an electrode.

The conditions for the vacuum melting are not particularly limited, and the known conditions may be employed.

In the production step, each of Ti and N may be previously added to the material or may be added to the molten steel during the vacuum melting.

A preferred embodiment of the production step includes adding N to the molten steel. In such embodiment, the molten steel before addition of N preferably includes from 0.2 to 3.0% by mass of Ti. More preferably, the molten steel before addition of N further includes the components of the maraging steel to be finally produced, in addition to Ti.

In the embodiment, addition of N to the molten steel leads to reaction of Ti with N in the process of solidifying the molten steel to form Ti-based non-metallic inclusions such as TiN and TiCN.

A suitable process for adding N to the molten steel is to introduce nitrogen gas ($N_2$ gas) into the vacuum melting furnace (an atmosphere in contact with the molten steel). Such process more readily forms the Ti-based non-metallic inclusions having a larger size compared to the oxide-based inclusions, and thus the effects of the present invention as described above can be more effectively provided.

In such process, nitrogen gas is preferably introduced into the furnace to establish a nitrogen atmosphere in the furnace, and the atmosphere is maintained for 3 minutes or more (preferably 5 minutes or more). This allows more effective addition of N to the molten steel. Although the upper limit of the maintenance time is not critical, the time can be, for example, 30 minutes or less (preferably 20 minutes or less).

The pressure of the nitrogen atmosphere is preferably 1 kPa or more and more preferably 10 kPa or more for more effective addition of N to the molten steel. On the other hand, the pressure of the nitrogen atmosphere is preferably 40 kPa or less and more preferably 20 kPa or less for easier viewing of the interior of the vacuum furnace.

It is also preferred to reduce the pressure of the atmosphere after the maintenance. The pressure reduction allows N in the molten steel to be equilibrated with N in the atmosphere, which can hold the amount of N in the molten steel constant and thus can prevent excessive formation of the Ti-based non-metallic inclusions in the electrode.

The reduced pressure is desirably in the range from 200 Pa to 800 Pa to effectively provide the effect of the pressure reduction.

After reducing the pressure of the atmosphere, the pressure is preferably maintained for 30 minutes or more. This allows N in the molten steel to be effectively equilibrated. On the other hand, the reduced pressure is maintained for 180 minutes or less to further prevent the formation of the oxide in the molten steel.

As described above, the remelt electrode produced in this step includes from 0.2 to 3.0% by mass of Ti and from 0.0025 to 0.0050% by mass of N.

Preferably, the remelt electrode (and preferably a steel ingot as described below) further includes from 0.01 to 0.10% by mass (more preferably from 0.01 to 0.05% by mass) of Si. This allows increase in the activity of Ti and N, which can further increase the size of the Ti-based non-metallic inclusions such as TiN and TiCN and thus can enhance the above-mentioned effects of the present invention.

Preferably, the remelt electrode (and preferably a steel ingot as described below) further includes from 0.01 to 0.10% by mass (more preferably from 0.01 to 0.05% by mass) of Mn. This allows formation of intermetallic compounds together with Ni to enhance the aging ability, which can increase the fracture sensitivity due to the Ti-based non-metallic inclusions such as TiN and TiCN and thus can enhance the above-mentioned effects of the present invention.

Preferably, the remelt electrode (and preferably a steel ingot as described below) further includes 1.7% by mass or less of Al. Inclusion of Al in the remelt electrode (and preferably a steel ingot as described below) allows the strength after aging of the steel ingot to be further increased. Inclusion of 1.7% by mass or less of Al allows the toughness after aging of the steel ingot to be further improved.

Preferably, the remelt electrode (and preferably a steel ingot as described below) includes 0.01% by mass or less of C (carbon). This allows further prevention of reduction of precipitation of intermetallic compounds due to formation of carbides, thereby further preventing reduction in fatigue strength.

Preferably, the remelt electrode (and preferably a steel ingot as described below) includes from 8.0 to 22.0% by mass of Ni (nickel). Inclusion of 8.0% by mass or more of Ni allows further prevention of reduction in the toughness of the steel ingot. If the electrode and the steel ingot included Ni in an amount of 22.0% by mass or less, stabilization of austenite in the ingot would be suppressed, and thus martensite further tends to be formed.

Preferably, the remelt electrode (and preferably a steel ingot as described below) includes from 2.0 to 9.0% by mass of Mo (molybdenum). Inclusion of 2.0% by mass or more of Mo allows fine intermetallic compounds which include Mo to be readily formed by aging treatment. Precipitation of such intermetallic compounds in the matrix allows strength of the steel ingot to be further improved.

Preferably, the remelt electrode (and preferably a steel ingot as described below) includes from 5.0 to 20.0% by mass of Co (cobalt). Inclusion of 5.0% by mass or more of Co allows solid solubility of Mo to be further reduced, thereby facilitating formation of fine intermetallic compounds by Mo and precipitation of the compounds. Inclusion of 20.0% by mass or less of Co allows the embrittlement to be further inhibited.

Preferably, the remelt electrode (and preferably a steel ingot as described below) includes 0.0015% by mass or less of O (oxygen). This allows growth of the oxide-based inclusions to be inhibited thereby further preventing reduction in fatigue strength.

Preferably, the remelt electrode has the substantially same chemical composition as a steel ingot (maraging steel) to be produced, except for the amount of N.

Especially preferably, the remelt electrode has a chemical composition of 0.01% by mass or less of C, 1.7% by mass or less of Al, from 0.01 to 0.10% by mass of Si, from 0.01 to 0.10% by mass of Mn, from 0.2 to 3.0% by mass of Ti, from 8.0 to 22.0% by mass of Ni, from 5.0 to 20.0% by mass of Co, from 2.0 to 9.0% by mass of Mo, from 0.0025 to 0.0050% by mass of N, 0.0015% by mass or less of O, and the balance being Fe and unavoidable impurities.

<Step of Producing Steel Ingot>

The step of producing a steel ingot is to produce a steel ingot by remelting the remelt electrode described above.

Examples of the remelting process include vacuum arc remelting and electroslag remelting. Especially, the vacuum arc remelting is preferred, because such process can provide a steel ingot which is uniform (i.e., exhibits low segregation of components) and which has a low content of non-metallic inclusions such as TiN and TiCN.

It is obvious that the remelted electrode is solidified to produce a steel ingot in the step.

A suitable embodiment of the remelting process is a process which provides a steel ingot which includes less N than N in the remelt electrode.

Preferably, the steel ingot produced by the step has the substantially same chemical composition as the composition of the remelt electrode, except for the amount of N.

Especially preferably, the steel ingot has a chemical composition of 0.01% by mass or less of C, 1.7% by mass or less of Al, from 0.01 to 0.10% by mass of Si, from 0.01 to 0.10% by mass of Mn, from 0.2 to 3.0% by mass of Ti, from 8.0 to 22.0% by mass of Ni, from 5.0 to 20.0% by mass of Co, from 2.0 to 9.0% by mass of Mo, less than 0.0025% by mass of N, 0.0015% by mass or less of O, and the balance being Fe and unavoidable impurities.

The production method of the present invention may include, if necessary, an additional step other than the step of producing a remelt electrode and the step of producing a steel ingot.

Examples of the additional step include known steps such as hot forging, soaking, rolling, and aging.

EXAMPLES

Now, the present invention will be specifically described with reference to the Examples, although the present invention is not limited thereto. Low-cycle fatigue testing was performed herein in accordance with ASTM E606.

Example 1

<Production of Remelt Electrode and Steel Ingot>

A remelt electrode which had the composition shown in "Electrode" in the Table 1 was produced by vacuum melting.

In particular, nitrogen gas was introduced into an atmosphere in contact with molten steel during vacuum melting to establish a nitrogen atmosphere having a pressure of 13 kPa. The atmosphere was maintained for 10 minutes to increase the amount of N in the molten steel. Then the pressure of the atmosphere was reduced to 300 Pa to equilibrate N in the molten steel. In the equilibrium, melting was continued for 90 minutes. Then the molten steel was tapped, and the tapped molten steel was solidified to produce a remelt electrode.

Next, the resultant remelt electrode was remelted by vacuum arc remelting to produce a steel ingot (maraging steel) which had the composition shown in "Steel Ingot" in the Table 1 below.

The resultant steel ingot had an average diameter of 800 mm.

As shown in the Table 1, the resultant steel ingot included less N compared to the remelt electrode. The amount of O was also reduced slightly compared to the remelt electrode.

<Low-Cycle Fatigue Testing>

The resultant steel ingot was hot forged to produce a billet having a diameter of 180 mm (Billet No. A) and a billet having a diameter of 250 mm (Billet No. B).

For low-cycle fatigue testing, 3 or 4 test specimens having a diameter of 10 mm and a length of the parallel portion of 20 mm (Test Specimens No. 1-4 shown in the Table 2 below) were obtained from each of the top side and the bottom side of the resultant billets. Each of the test specimens was obtained from the area extending a length of a quarter of the billet diameter from the center of the billet diameter. And each of the test specimens was obtained such that the force might be applied in the direction of the billet diameter in low-cycle fatigue testing.

On the resultant test specimens, low-cycle fatigue testing was performed at a temperature of 200° C., a frequency of 1 Hz, and a strain of from 0 to 0.80%.

In the testing, cycle index was determined as a value that increases in proportion to an increase in the number of cycles to failure. A larger cycle index indicates a higher number of cycles to failure. In practice, a cycle index of 1.00 or more has been found to be acceptable.

In the testing, fracture origins in the fracture cross-section were also observed, and locations of the fracture origins were classified as TiN, oxide, void, other, or unknown.

The results are shown in the Table 2 below.

Comparative Example 1

A remelt electrode and a steel ingot were produced in the same manner as in the Example 1, except that N was not added during vacuum melting and that the resultant steel ingot had an average diameter of 500 mm, and low-cycle fatigue testing was performed in the same manner as in the Example 1.

The composition of the remelt electrode and the steel ingot is shown in the Table 1 below.

The results of the low-cycle fatigue testing are shown in the Table 2 below.

Comparative Example 2

A remelt electrode and a steel ingot were produced in the same manner as in the Example 1, except that the resultant steel ingot had an average diameter of 500 mm, and low-cycle fatigue testing was performed in the same manner as in the Example 1.

The composition of the remelt electrode and the steel ingot is shown in the Table 1 below.

The results of the low-cycle fatigue testing are shown in the Table 2 below.

TABLE 1

|  |  | C | Al | Si | Mn | Ti | Ni | Co | Mo | O | N |
|---|---|---|---|---|---|---|---|---|---|---|---|
| Example 1 | Electrode | 0.0062 | 0.12 | 0.03 | 0.02 | 0.47 | 18.29 | 8.25 | 5.03 | 0.0004 | 0.0029 |
|  | Steel Ingot | 0.0026 | 0.12 | 0.03 | 0.02 | 0.48 | 18.31 | 8.22 | 5.06 | 0.0003 | 0.0011 |
| Comparative Example 1 | Electrode | 0.0027 | 0.12 | 0.02 | 0.05 | 0.47 | 18.28 | 8.23 | 5.00 | 0.0003 | 0.0010 |
|  | Steel Ingot | 0.0030 | 0.12 | 0.02 | 0.04 | 0.48 | 18.28 | 8.29 | 5.02 | 0.0002 | 0.0006 |
| Comparative Example 2 | Electrode | 0.0047 | 0.11 | 0.02 | 0.02 | 0.48 | 18.33 | 8.24 | 5.02 | 0.0010 | 0.0025 |
|  | Steel Ingot | 0.0047 | 0.11 | 0.02 | 0.02 | 0.48 | 18.35 | 8.27 | 5.05 | 0.0003 | 0.0012 |

Description of Table 1

The figure for each of the elements in the Table 1 refers to the amount (% by mass) of the element in the electrode or the steel ingot.

Each of the electrodes or the steel ingots includes Fe and unavoidable impurities in addition to the elements shown in the Table 1.

TABLE 2

| Billet No. | Portion | Test Specimen No. | Example 1 Cycle Index | Example 1 fracture origin | Comparative Example 1 Cycle Index | Comparative Example 1 fracture origin | Comparative Example 2 Cycle Index | Comparative Example 2 fracture origin |
|---|---|---|---|---|---|---|---|---|
| A (Diameter: 180 mm) | Top | 1 | 1.12 | Other | 17.36 | Oxide | 1.18 | Other |
|  |  | 2 | 1.10 | Unknown | 1.17 | Void | 0.91 | Oxide |
|  |  | 3 | 1.34 | TiN | 1.11 | Void | 2.81 | TiN |
|  |  | 4 | — | — | 2.00 | Oxide | — | — |
|  | Bottom | 1 | 4.93 | TiN | 23.73 | Void | 1.40 | Oxide |
|  |  | 2 | 4.28 | TiN | 2.70 | Oxide | 1.35 | Oxide |
|  |  | 3 | 17.81 | TiN | 2.91 | Void | 1.02 | Oxide |
|  |  | 4 | — | — | 20.01 | Oxide | — | — |
| B (Diameter: 250 mm) | Top | 1 | 1.28 | TiN | 9.48 | Unknown | 0.97 | Oxide |
|  |  | 2 | 1.28 | TiN | 5.26 | Unknown | 1.92 | Other |
|  |  | 3 | 1.17 | Other | 12.69 | Oxide | 3.03 | Oxide |
|  |  | 4 | — | — | 10.42 | Oxide | — | — |
|  | Bottom | 1 | 1.21 | TiN | 14.48 | Oxide | 8.98 | Oxide |
|  |  | 2 | 1.11 | TiN | — | — | 3.32 | Oxide |
|  |  | 3 | 1.42 | TiN | 6.58 | Oxide | 1.27 | Oxide |
|  |  | 4 | — | — | 7.63 | Unknown | — | — |
| Average Cycle Index |  |  | 3.17 | — | 9.17 | — | 2.35 | — |
| Maximum Cycle Index |  |  | 17.81 | — | 23.73 | — | 8.98 | — |
| Minimum Cycle Index |  |  | 1.10 | — | 1.11 | — | 0.91 | — |

As shown in the Table 2, the Example 1, in which the electrode included 0.0025% by mass or more of N and the steel ingot had an average diameter of 650 mm or more, exhibited a small variation in the cycle indexes and somewhat high average and minimum cycle index. In other words, the Example 1 exhibited a small variation in the test results and somewhat high fatigue strength.

In contrast, the Comparative Example 1, in which the electrode included 0.0010% by mass of N and the steel ingot had an average diameter of 500 mm, exhibited a larger variation in the cycle indexes (i.e., fatigue strength). For example, the Comparative Example 1 exhibited the minimum cycle index which was about a ninth of the average cycle index.

The Comparative Example 2, in which the electrode included 0.0025% by mass or more of N and the steel ingot had an average diameter of 500 mm, exhibited a smaller average cycle index and especially, a cycle index of less than 1.00.

As shown in the Table 2, in the Example 1, most of the fracture origins were Ti-based non-metallic inclusions (TiN).

Figure 2:
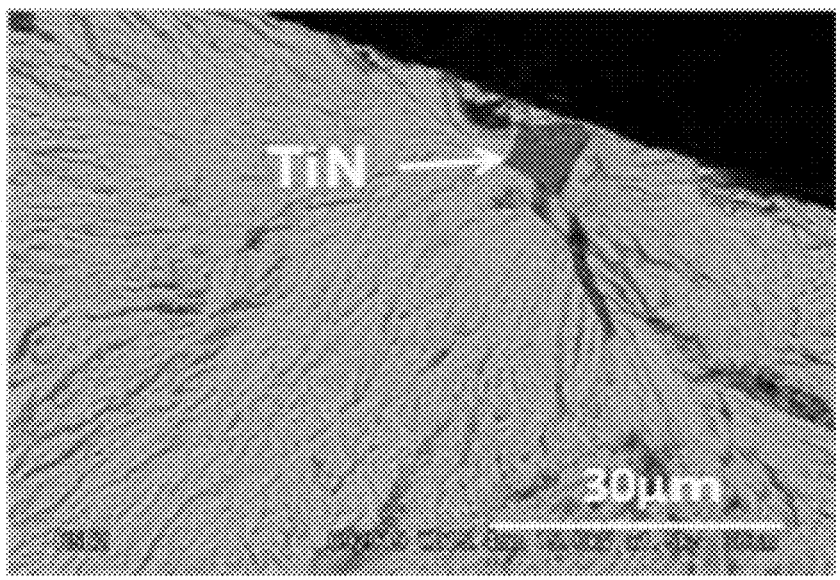
FIG. 2 is a scanning electron microscope image (back-scattered electron image (composition image)) of a fracture cross-section of a test specimen after low-cycle fatigue testing in the Example 1.

FIGS. 1 and 2 are a scanning electron microscope image (hereinafter also referred to as "SEM" image) of the fracture cross-section of a test specimen after low-cycle fatigue testing in the Example 1.

FIG. 1 is a secondary electron image of the fracture cross-section of the test specimen, while FIG. 2 is a back-scattered electron image (composition image) of the same fracture cross-section as the fracture cross-section shown in FIG. 1.

Unlike the Example 1, the Comparative Example 1 exhibited no fracture origins classified as TiN, and most of the fracture origins were classified as oxide or void.

The Comparative Example 2 also exhibited very little fracture origins classified as TiN, and most of the fracture origins were classified as oxide or void.

Next, we determined the relationship between the average diameter of a steel ingot and the number of oxide-based inclusions in a billet prepared by hot forging the steel ingot.

In particular, Billet A prepared from the Example 1, in which the steel ingot had an average diameter of 800 mm, was measured, by SEM, for the number of the oxide-based inclusions which were present in an area of 55 mm$^2$ and which had a size of 1.5 μm or more. The resultant number of the oxide-based inclusions was used to determine the index of the number of the oxide-based inclusions. Note that the index of the number of the oxide-based inclusions is an index which increases in proportion to an increase in the number of the oxide-based inclusions.

Next, two billets were prepared in the same manner as the manner for the Billet A from the Example 1, except that the steel ingot had an average diameter of 600 mm or 690 mm. Billet C, which had a cross-sectional area that was half the cross-sectional area of the Billet A, was prepared in the same manner as the manner for the Billet A from the Example 1, except that the steel ingot had an average diameter of 500 mm and that the billet had a cross-sectional area that was half the cross-sectional area of the Billet A to increase the forging ratio. Each of the resultant three billets was measured, by SEM, for the number of the oxide-based inclusions in the same manner as the manner described above, and the index of the number of the oxide-based inclusions was determined in the same manner as the manner described above.

FIG. 3 is a graph showing the relationship between the average diameter of a steel ingot and the index of the number of oxide-based inclusions.

FIG. 3 confirms that a steel ingot having an average diameter of 650 mm or more leads to significant reduction in the index of the number of the oxide-based inclusions (i.e., the number of the oxide-based inclusions).

The result shows that a steel ingot having an average diameter of 650 mm or more can produce the full effect of floatation separation of the oxide-based inclusions and significantly reduce the number of the oxide-based inclusions.

Next, the billets in the Example 1 and the Comparative Examples 1 and 2 were measured for the size of the Ti-based non-metallic inclusions in the billets by the acid extraction process as described below.

Determination of Size of Ti-Based Non-Metallic Inclusions by Acid Extraction Process 5 g of test specimens were obtained from the billets for measurement of the size of the inclusions, and the resultant test specimens were dissolved in a nitric acid solution. The resultant solution was passed through a filter to give Ti-based non-metallic inclusions (TiN and TiCN), which was the residue (substance which remains undissolved). Then the Ti-based non-metallic inclusions on the filter were examined under SEM to determine the size of the Ti-based non-metallic inclusions. The size of the Ti-based non-metallic inclusions was determined as the diameter of a circle circumscribing the Ti-based non-metallic inclusions.

The results show that the billets in the Example 1 had a size of the Ti-based non-metallic inclusions of up to 11.9 µm, and most of the Ti-based non-metallic inclusions had a uniform size of about 10 µm.

On the other hand, the billets in the Comparative Example 1 had a size of the Ti-based non-metallic inclusions of up to 6.3 µm.

The billets in the Comparative Example 2 had a size of the Ti-based non-metallic inclusions of up to 7.8 µm.

Therefore, it has been found that the production method of the present invention can produce a steel ingot (maraging steel) which includes uniformly dispersed Ti-based non-metallic inclusions having a moderate size and a relatively small variation in size.

In such steel ingot, the Ti-based non-metallic inclusions can act as fracture origins for most of the fatigue fractures in fatigue testing, which can reduce variation in the test results (number of cycles to failure). Because the steel ingot includes the uniformly dispersed Ti-based non-metallic inclusions which have a moderate size and a relatively small variation in size, the size effect is reduced. Thus, in fatigue testing, a highly reliable representative value of the fatigue strength can be obtained with a smaller number of tests.

And the steel ingot includes the Ti-based non-metallic inclusions which are not too large and not too small (e.g., which is larger than the oxide-based inclusions), therefore the lowering of the limit value (lower limit) of the fatigue strength is suppressed.

The invention claimed is:

1. A method for producing a maraging steel, the method comprising:
producing a remelt electrode by vacuum melting, the remelt electrode comprising from 0.2 to 3.0% by mass of Ti and from 0.0029 to 0.0050% by mass of N; and
remelting the remelt electrode to produce the maraging steel in the form of a steel ingot containing substantially no Mg and having an average diameter of 650 mm or more, the steel ingot comprising a TiN inclusion having a size of 9 µm to 15 µm,
wherein:
the producing of the remelt electrode comprises adding N to a molten steel by introducing nitrogen gas into an atmosphere in contact with the molten steel under conditions in which a pressure of a nitrogen atmosphere of from 1 kPa to 40 kPa is maintained for 3 minutes to 30 minutes, and a pressure of the nitrogen atmosphere is subsequently reduced to a range of 200 Pa to 800 Pa and is maintained for 30 minutes to 180 minutes; and
the maraging steel comprises from 0.2 to 3.0% by mass of Ti.

2. The production method of a maraging steel according to claim 1, wherein the remelt electrode further comprises from 0.01 to 0.10% by mass of Si.

3. The production method of a maraging steel according to claim 1, wherein the remelt electrode further comprises from 0.01 to 0.10% by mass of Mn.

4. The production method of a maraging steel according to claim 1, wherein the remelt electrode further comprises 1.7% by mass or less of Al.

5. The production method of a maraging steel according to claim 1, wherein the remelt electrode has a chemical composition of 0.01% by mass or less of C, 1.7% by mass or less of Al, from 0.01 to 0.10% by mass of Si, from 0.01 to 0.10% by mass of Mn, from 0.2 to 3.0% by mass of Ti, from 8.0 to 22.0% by mass of Ni, from 5.0 to 20.0% by mass of Co, from 2.0 to 9.0% by mass of Mo, from 0.0025 to 0.0050% by mass of N, 0.0015% by mass or less of O, and the balance being Fe and unavoidable impurities.

6. The production method of a maraging steel according to claim 1, wherein the steel ingot has a chemical composition of 0.01% by mass or less of C, 1.7% by mass or less of Al, from 0.01 to 0.10% by mass of Si, from 0.01 to 0.10% by mass of Mn, from 0.2 to 3.0% by mass of Ti, from 8.0 to 22.0% by mass of Ni, from 5.0 to 20.0% by mass of Co, from 2.0 to 9.0% by mass of Mo, less than 0.0025% by mass of N, 0.0015% by mass or less of O, and the balance being Fe and unavoidable impurities.

* * * * *